United States Patent
Fisher

(10) Patent No.: US 7,345,811 B2
(45) Date of Patent: Mar. 18, 2008

(54) MULTIMODE FIBER OPTIC AMPLIFIER AND METHOD OF AMPLIFYING OPTICAL SIGNALS

(75) Inventor: Donald Scott Fisher, Spring Valley Township, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/729,819

(22) Filed: Mar. 30, 2007

(65) Prior Publication Data
US 2007/0188852 A1    Aug. 16, 2007

Related U.S. Application Data

(62) Division of application No. 11/194,762, filed on Aug. 2, 2005, now Pat. No. 7,224,516.

(51) Int. Cl.
*H01S 4/00* (2006.01)
*H04B 10/12* (2006.01)

(52) U.S. Cl. .................. 359/337.2; 359/337.21; 359/341.41; 359/341.42

(58) Field of Classification Search ............ 359/337.2, 359/337.21, 341.41, 341.42
See application file for complete search history.

(56) References Cited

U.S. PATENT DOCUMENTS

| | | | |
|---|---|---|---|
| 5,187,759 A | 2/1993 | DiGiovanni et al. | |
| 5,361,319 A | 11/1994 | Antos et al. | |
| 5,717,510 A | 2/1998 | Ishikawa et al. | |
| 5,754,322 A | 5/1998 | Ishikawa et al. | |
| 5,815,294 A | 9/1998 | Ishikawa et al. | |
| 5,818,630 A | 10/1998 | Fermann et al. | |
| 5,870,213 A | 2/1999 | Ishikawa et al. | |
| 6,151,158 A | 11/2000 | Takeda et al. | |
| 6,690,506 B2 | 2/2004 | Zahnley et al. | |
| 6,810,175 B1 | 10/2004 | Wey et al. | |
| 2002/0176156 A1 | 11/2002 | Zahnley et al. | |
| 2004/0062557 A1 | 4/2004 | Takashima et al. | |
| 2004/0208534 A1 | 10/2004 | Boertjes et al. | |

OTHER PUBLICATIONS

Gangl, Michael E. and Donald S. Fisher, "Airborne Laser Communication Terminal for Intelligence, Surveillance and Reconnaissance", *Proceedings of SPIE, The International Society for Optical Engineering*, Aug. 2-4, 2004, pp. 92-103, vol. 5550, Denver, Colorado, USA.

*Primary Examiner*—Deandra Hughes
*Assistant Examiner*—Eric Bolda
(74) *Attorney, Agent, or Firm*—Edell, Shapiro & Finnan LLC

(57) ABSTRACT

A multimode fiber receiver includes a multimode collimator, a multimode fiber optic amplifier and a detector. The collimator receives incoming signals and provides the signals to the amplifier. The amplifier includes plural amplification stages, a limiter, a tunable narrow band filter and a microcontroller. The amplification stages each include a gain element and a noise filter. The limiter receives the amplified signals and limits the energy of those signals. The optical signals subsequently traverse the narrow band filter including an adjustable pass band to provide desired signals to the detector. The microcontroller measures the energy of the incoming and output signals to control the limiter, amplification stages and/or narrow band filter in order to produce signals within the dynamic range of a particular application. The multimode fiber optic amplifier and/or receiver of the present invention is preferably utilized within an optical communication unit.

8 Claims, 2 Drawing Sheets

MULTIMODE FIBER OPTIC AMPLIFIER AND METHOD OF AMPLIFYING OPTICAL SIGNALS

CROSS-REFERENCE TO RELATED APPLICATIONS

This application is a divisional of U.S. patent application Ser. No. 11/194,762, entitled "Multimode Fiber Optic Amplifier and Method of Amplifying Optical Signals" and filed Aug. 2, 2005 now U.S. Pat. No. 7,224,516. The disclosure of the above-mentioned patent application is incorporated herein by reference in its entirety.

GOVERNMENT LICENSE RIGHTS

The U.S. Government may have a paid-up license in this invention and the right in limited circumstances to require the patent owner to license others on reasonable terms as provided for by the terms of contract No. F33615-01-D-1849.

BACKGROUND OF THE INVENTION

1. Technical Field

The present invention pertains to optical communication systems. In particular, the present invention pertains to a multimode fiber optic amplifier employing dynamic gain adjustment to produce amplified optical signals with reduced noise and at desired levels to prevent saturation of an optical detector. The present invention amplifier is preferably utilized within a receiving unit for an optical communications system.

2. Discussion of Related Art

Optical communication systems transmit information in the form of optical signals through the environment between optical communication units. The transmitted signals typically encounter atmospheric and other conditions. An optical communication unit generally employs a large optic to focus received optical signals directly onto a detector for signal detection. However, some communications units may utilize an amplifier to amplify received optical signals and enable detection of weaker signals.

Optical amplifiers for amplifying optical signals within optical communication systems have generally been implemented based on single mode fibers. These types of amplifiers tend to have reduced noise. Basically, an optical fiber is typically cylindrical and includes a central portion or core surrounded by an optical material or cladding. Light or optical signals are guided by the fiber through the core, while the cladding maintains the light within the core by internal reflection. Single mode fibers have a core with small dimensions, thereby enabling light to traverse the core in a single ray. In contrast, multimode fibers include a core with greater dimensions enabling light to traverse the core in a plurality of rays or modes.

However, single mode amplifiers suffer from several disadvantages. Initially, the probability of reception of a transmitted optical signal at an optical communication unit is enhanced in accordance with the diameter and field of view (e.g., commonly referred to as the numerical aperture or acceptance angle) of an optical fiber receiving the transmitted signal. These fiber characteristics should be maximized for a particular application to achieve increased reception probability. Since single mode fibers generally have a relatively small diameter and a standard numerical aperture, the probability of reception of a transmitted signal via a single mode fiber is limited. Further, single mode fibers require complex connections relative to multimode fibers, thereby complicating the amplifier or system.

Although multimode fibers include a greater diameter to enhance reception probability, the additional modes provided by this type of fiber produce noise (e.g., Amplified Spontaneous Emission (ASE)) that may dominate the desired single mode signal.

OBJECTS AND SUMMARY OF THE INVENTION

Accordingly, it is an object of the present invention to amplify optical signals within a receiver of an optical communications unit via a multimode fiber optic amplifier producing amplified signals with reduced noise.

It is another object of the present invention to employ a tunable narrow band filter within a multimode fiber optic amplifier to provide amplified optical signals with reduced noise.

Yet another object of the present invention is to employ a dynamic limiter within a multimode fiber optic amplifier to prevent amplified signals from saturating an optical detector of an optical communications unit.

Still another object of the present invention is to dynamically control amplification of optical signals by a multimode fiber optic amplifier to produce signals within a desired range for detection by an optical detector of an optical communications unit.

The aforesaid objects may be achieved individually and/or in combination, and it is not intended that the present invention be construed as requiring two or more of the objects to be combined unless expressly required by the claims attached hereto.

According to the present invention, a multimode fiber receiver includes a multimode collimator, a multimode fiber optic amplifier and a detector. The collimator receives incoming signals and provides the signals to the amplifier. The amplifier includes plural amplification stages, a limiter, a tunable narrow band filter and a microcontroller. The amplification stages are arranged in a serial fashion and each include a gain element and a noise filter, where the noise filter removes noise from the amplified signals. The collimator signals are conveyed by multimode fiber to the amplification stages for processing. The gain applied by the amplification stages to the signals is controlled by the microcontroller. The signals are conveyed by multimode fiber to the amplification stages for processing. The gain applied by the amplification stages to the signals is controlled by the microcontroller. The limiter receives the amplified signals from the amplification stages and limits the energy of the optical signals in accordance with control signals from the microcontroller. The optical signals from the limiter traverse the narrow band filter to provide desired signals to the detector. The pass band of the narrow band filter is adjusted in accordance with control signals from the microcontroller. The microcontroller measures the energy of the incoming and amplifier output signals to provide the appropriate control signals and enable the multimode fiber optic amplifier to produce signals within the dynamic range of a particular application. The multimode fiber optic amplifier and/or receiver of the present invention is preferably utilized within an optical communication unit, but may be utilized for any application to receive and/or amplify optical signals.

The present invention provides several advantages. In particular, the present invention amplifier is compatible with multimode fibers with maximum dimensions of approximately fifty microns and other multimode components (e.g., multimode collimator, etc.). Further, the present invention produces amplified signals with reduced noise by employing a tunable narrow band filter to reduce signal noise levels. In addition, the present invention prevents saturation of optical detectors by producing signals below a detector saturation level via a dynamic limiter.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
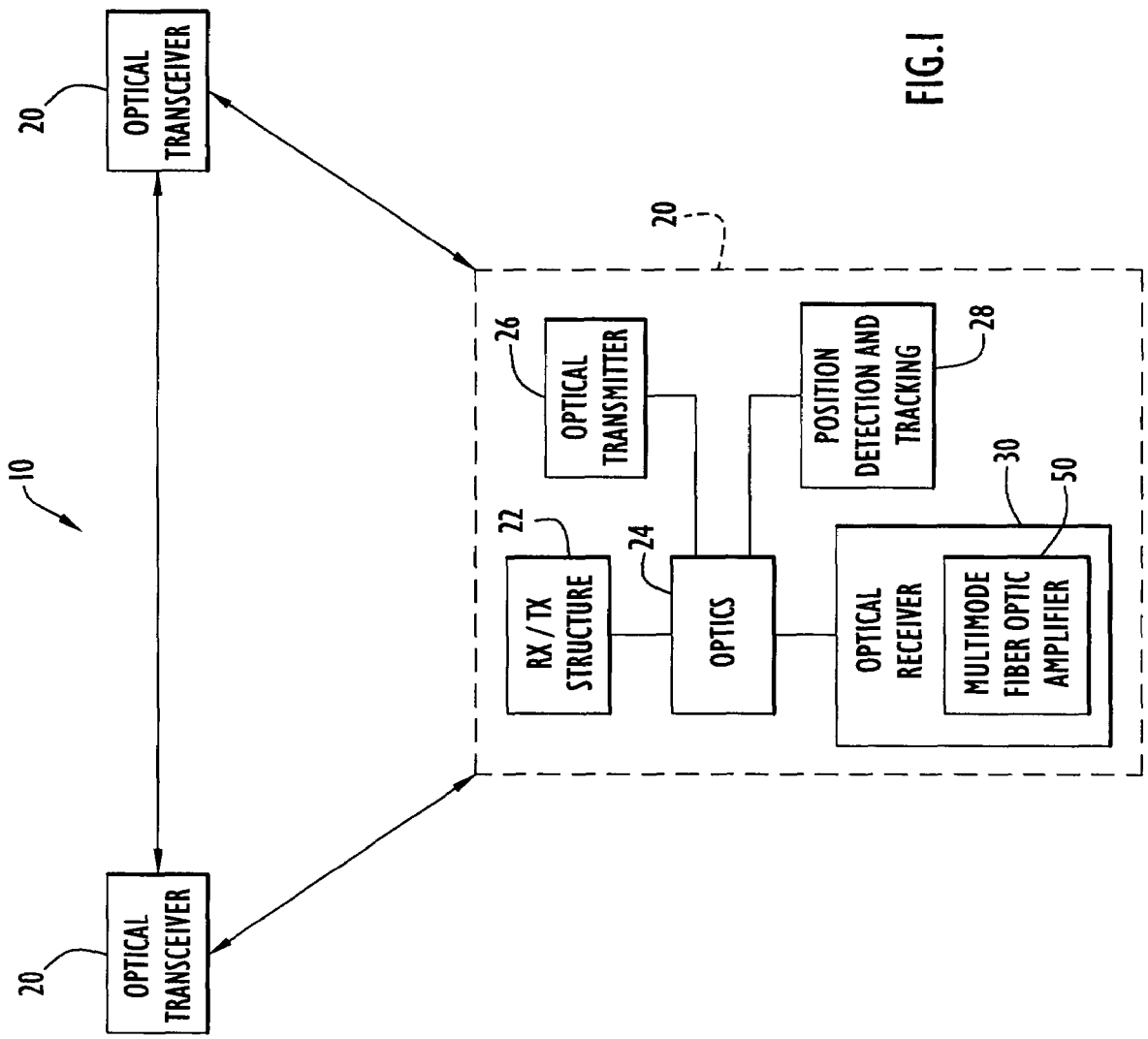
FIG. 1 is block diagram of an exemplary optical communications system employing an optical receiver with a multimode fiber optic amplifier according to the present invention.

An exemplary optical communications system employing an optical receiver with a multimode fiber optic amplifier according to the present invention is illustrated in FIG. 1. Specifically, optical communications system 10 includes a plurality of optical transceivers 20 each located at a different site. The optical transceivers communicate with each other based on transmission and reception of optical signals, preferably in the form of laser signals. The exemplary system may be utilized for air-to-air or air-to-ground applications.

Transceivers 20 each transmit and receive optical signals and include a receive/transmit structure 22, an optics unit 24, an optical transmitter 26, a position and tracking unit 28 and an optical receiver 30. Receiver 30 includes a multimode fiber optic amplifier 50 according to the present invention. Structure 22 interfaces a surrounding environment to receive and transmit optical signals, while optics unit 24 is coupled to transceiver components (e.g., optical transmitter 26, position unit 28 and optical receiver 30) to direct signals to and from structure 22. By way of example, structure 22 may be implemented by a conventional common aperture telescope.

Optical transmitter 26 produces optical signals for transmission by structure 22, while position and tracking unit 28 receives incoming optical signals from optics unit 24 and other information (e.g., GPS location, etc.) and determines the appropriate settings to enable the optical transceiver to lock onto an optical signal transmitted by another optical transceiver 20.

Optical receiver 30 receives and processes incoming optical signals from optics unit 24. The optical receiver includes multimode fiber optic amplifier 50 to amplify optical signals received by the receiver for detection and/or processing. This amplification enables the receiver to detect and/or process weak optical signals and provides the receiver with enhanced sensitivity.

Figure 2:
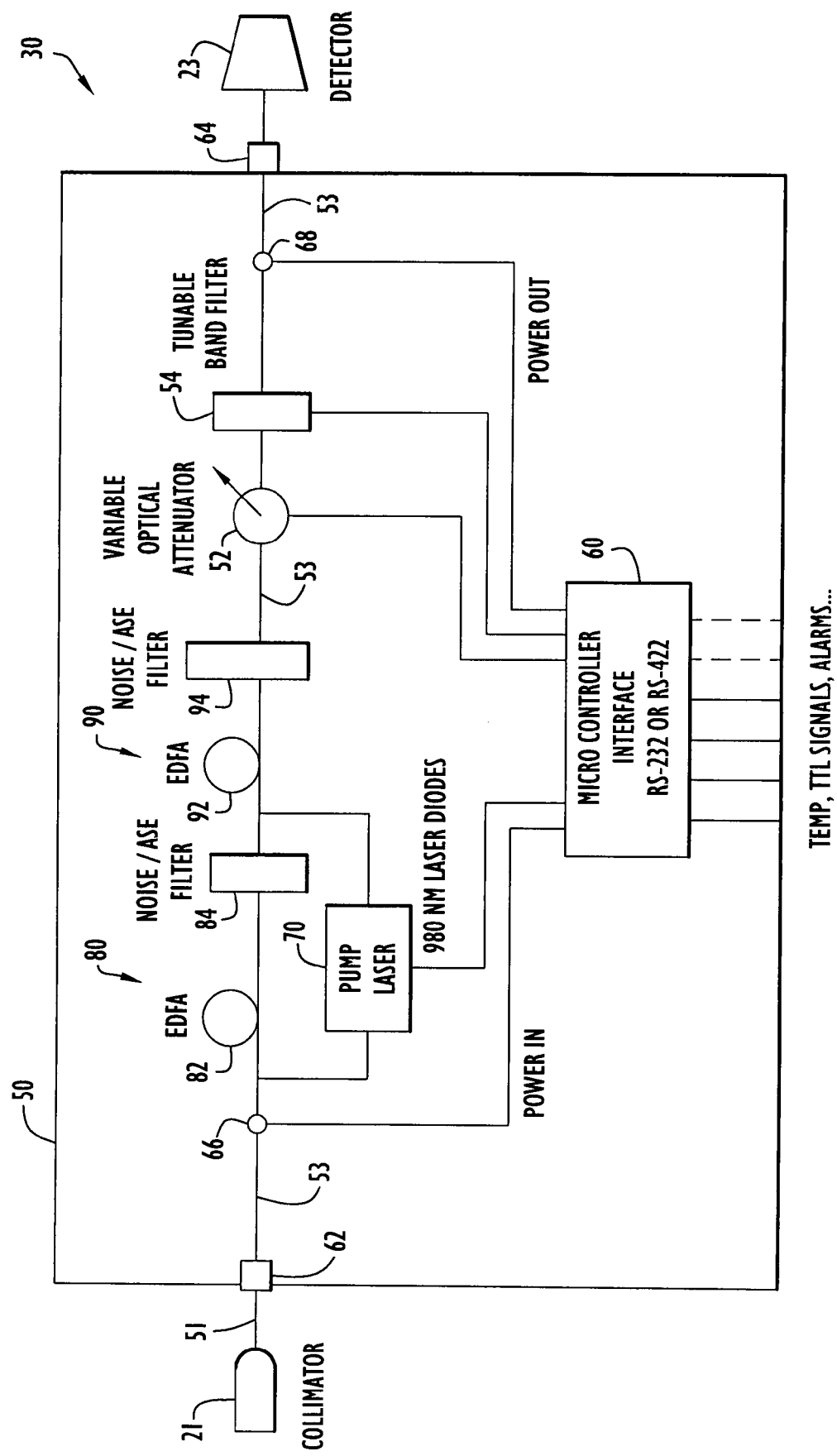
FIG. 2 is a schematic block diagram of the receiver of FIG. 1 including the multimode fiber optic amplifier according to the present invention.

Optical receiver 30 including multimode fiber optic amplifier 50 according to the present invention is illustrated in FIG. 2. Specifically, optical receiver 30 includes a multimode fiber collimator 21, multimode fiber optic amplifier 50 and a detector 23. The collimator and detector are typically implemented by conventional optical components and are preferably compatible with fifty micron multimode optical fiber. By way of example only, collimator 21 includes a numerical aperture of 0.14 and may accommodate a data stream of 3.125 Gigabits per second (Gb/s).

Collimator 21 receives incoming optical signals from optics unit 24 (FIG. 1). The collimator produces a collimated beam and is coupled to a conventional SMA type fiber connector 62 of amplifier 50 via a multimode fiber 51. Connector 62 is further coupled to a multimode fiber 53 extending through amplifier 50 to convey the optical signals. Fibers 51, 53 typically include transverse cross-sectional dimensions of fifty microns for compatibility with each other and the collimator. By way of example only, fiber 53 further includes a numerical aperture of 0.13. The transverse cross-sectional dimensions of fibers 51, 53 (e.g., fifty microns) provide a greater surface area to enhance collection efficiency of the optical signal (e.g., by greater than 100 times relative to the efficiency of a single mode fiber) from the collimator. In addition, the multimode fibers require a less complex connection arrangement relative to single mode fibers as described above.

Amplifier 50 includes amplification stages 80, 90, a limiter or switch 52, a tunable narrow band filter 54 and a microcontroller 60. Amplification stage 80 receives and amplifies the collimated optical signals from fiber 53. The amplification stage includes a multimode gain element or amplifier 82 and a noise filter 84. Gain element 82 is preferably implemented by a multimode erbium doped fiber amplifier (EDFA). This type of amplifier generally includes a fiber doped with erbium or other rare earth element including atomic structures for amplifying light. Basically, energy is injected into the doped fiber to stimulate the atoms of the rare earth element to release stored energy in the form of light within a particular wavelength range (e.g., 1310 nanometers or 1550 nanometers). A weak optical signal within the wavelength range (e.g., 1310 nanometers or 1550 nanometers) of the released energy and entering the fiber absorbs the released energy during traversal of the fiber, thereby producing an amplified signal. Fiber optic amplifier 50 includes a pump laser 70 to inject the appropriate energy to stimulate the doped fiber and amplify the optical signals. The pump laser is typically coupled to fiber 53 to inject the stimulation energy into that fiber toward the input of gain element 82. By way of example only, the pump laser is implemented by laser diodes providing laser signals including a wavelength of approximately 980 nanometers. However, the pump laser may be implemented by any conventional or other device providing laser or other energy signals of any suitable wavelengths compatible with a doped fiber. The pump laser is controlled by microcontroller 60 to control stimulation of the doped fiber and the gain applied to the optical signals.

The amplified signals from multimode gain element 82 are applied to noise filter 84. The noise filter is preferably in the form of a fixed Amplified Spontaneous Emission (ASE) filter. The amplified signals basically contain the desired band and extraneous signals in the form of white light. Noise filter 84 removes or filters the white light to provide an amplified signal with reduced noise.

Amplified signals from amplification stage 80 (e.g., noise filter 84) are received by amplification stage 90 via fiber 53. Amplification stage 90 is substantially similar to amplification stage 80 described above and includes a multimode gain element or amplifier 92 and a noise filter 94. Gain element 92 is substantially similar to gain element 82 and is preferably implemented by a multimode erbium doped fiber amplifier (EDFA) as described above. Pump laser 70 is further coupled to fiber 53 toward the input of gain element 92 to inject the stimulation energy for the gain element into that fiber. The pump laser is controlled by microcontroller 60 to control stimulation of the doped fiber of gain element 92 and the gain applied to the optical signals as described above. The amplified signals from multimode gain element 92 are applied to noise filter 94. The noise filter is substantially similar to noise filter 84 and is preferably in the form of a fixed Amplified Spontaneous Emission (ASE) filter as described above. Noise filter 94 removes or filters extraneous white light to provide an amplified signal with reduced noise as described above. The amplification stages basically enhance the sensitivity of receiver 30. By way of example only, receiver 30 may be configured to include a sensitivity of −42 dBm.

Limiter 52 is preferably in the form of a conventional Variable Optical Attenuator (VOA) and receives the amplified optical signals from amplification stage 90 (e.g., noise filter 94) via fiber 53. The limiter controls the energy of the optical signals to prevent saturation of detector 23 in accordance with control signals from microcontroller 60. By way of example only, the limiter attenuates signals exceeding 7.5 dBm to prevent saturation of the detector. However, the limiter may attenuate signals of any desired signal level.

Narrow band filter 54 may be implemented by any conventional or other optical band pass filter. The narrow band filter receives the optical signals from limiter 52 via fiber 53 and filters those signals to provide optical signals within a desired band or range. This further reduces noise and assists the receiver with respect to locking onto a transmitted signal. The pass band of filter 54 is adjustable by microcontroller 60 to provide signals over a desired dynamic range. By way of example only, the filter may limit the optical band within a one nanometer range.

Microcontroller 60 may be implemented by any conventional or other microprocessor, controller or circuitry. The microcontroller controls amplifier 50 to optimize the amplified output signal and performs various safety monitoring to ensure proper receiver operation. In particular, the microcontroller provides control signals to limiter 52, narrow band filter 54 and pump laser 70 to control the gain of the optical signals. Specifically, an input photodiode 66 is disposed along fiber 53 between connector 62 and amplification stage 80 (e.g., gain element 82). The input photodiode may be implemented by any conventional or other optical sensor to measure the strength of the incoming optical signal. Similarly, an output photodiode 68 is disposed along fiber 53 subsequent narrow band filter 54. The output photodiode may be implemented by any conventional or other optical sensor to measure the strength of the amplified optical signal. Photodiodes 66, 68 are coupled to microcontroller 60 to provide optical signal measurements. The microcontroller processes the signal measurements and other information to control attenuation of limiter 52, the pass band of narrow band filter 54 and the gain of amplification stages 80, 90 (via pump laser 70) to produce signals in the desired dynamic range, preferably below the saturation level for detector 23. For example, when the output signal or gain (e.g., the amplified output signal divided by the incoming optical signal) attains a level exceeding a desired range, the microcontroller may lower the gain of the amplification stages, increase the attenuation of limiter 52 and/or adjust the pass band of the narrow band filter. If the output signal or gain attains a level below a desired range, the microcontroller may increase the gain of the amplification stages, decrease the attenuation of limiter 52 and/or adjust the pass band of the narrow band filter. The microcontroller preferably employs conventional techniques to process the signal measurements and determine the parameters to control the amplifier components. The microcontroller and photodiodes basically form a feedback loop to provide a variable gain and produce desired optical signals.

The microcontroller further monitors unit or system conditions and may perform various actions in response to those conditions. Specifically, the microcontroller may interface a processing system or other device (e.g., sensor, etc.) of the optical receiver or transceiver via any conventional or other suitable interface (e.g., RS-232, RS-422, etc.) to receive and/or provide information (e.g., temperature, TTL signals, alarms, etc.). The microcontroller processes the information to determine system conditions and may control various system components. For example, the microcontroller may receive temperature signals and disable the system (or specific system components) and/or provide alarms in response to excessive temperatures. Further, the microcontroller may be coupled to temperature devices (e.g., thermoelectric or other cooling/heating devices, etc.) and control those devices to maintain a desired operating temperature or temperature range for the system or unit.

The resulting signals from narrow band filter 54 are provided to multimode fiber 53. The multimode fiber is coupled to a conventional SMA type connector 64 of amplifier 50. Detector 23 is coupled to connector 64 via a multimode fiber 57 to receive the amplified signals for detection and/or processing by optical receiver 30. Fiber 57 typically includes transverse cross-sectional dimensions of fifty microns for compatibility with fiber 53 and the detector. The transverse cross-sectional dimensions of fiber 57 (e.g., fifty microns) match the dimensions of the detector to minimize or prevent deficient coupling and leakage, thereby maximizing the optical signals received by the detector. The multimode fiber further requires a less complex connection arrangement relative to single mode fibers as described above. The detector preferably operates at a bandwidth in the approximate range of two to three gigahertz, and provides a complementary match with multimode fibers 53, 57. By way of example, the detector may be implemented by a PIN type detector coupled to a fifty micron fiber (e.g., fiber 57).

Operation of the present invention amplifier is described with reference to FIG. 2. Specifically, fiber 53 receives incoming optical signals and conveys those signals to amplification stage 80. The incoming optical signals may be provided by various sources depending upon a particular application. By way of example only, the optical signals are provided by multimode collimator 21 of optical receiver 30 that is coupled to multimode fiber 53 via multimode fiber 51 and connector 62 as described above. Amplification stage 80 amplifies and filters noise from the incoming optical signals, where the amplified signals are further amplified and noise filtered by amplification stage 90. The amplification stages are controlled by microcontroller 60 as described above. Limiter 52 receives the amplified signals from amplification stage 90 and attenuates the optical signals in accordance with control signals from microcontroller 60 as described above. Narrow band filter 54 receives the attenuated signals and provides optical signals within a desired pass band in accordance with control signals from microcontroller 60 as described above. The microcontroller controls the amplifier components in accordance with the strengths of the input and amplified optical signals measured by photodiodes 66,

68 as described above. The resulting amplified signals are provided to multimode fiber 53 and may be supplied to various devices depending upon a particular application. By way of example only, the resulting amplified signals are provided to detector 23 of optical receiver 30 that is coupled to multimode fiber 53 via multimode fiber 57 and connector 64 as described above.

It will be appreciated that the embodiments described above and illustrated in the drawings represent only a few of the many ways of implementing a multimode fiber optic amplifier and method of amplifying optical signals.

The present invention amplifier may amplify any types of optical signals (e.g., light, laser, etc.) of any suitable wavelength or frequency. The present invention amplifier may receive optical signals from and provide amplified optical signals to any suitable optical devices (e.g., collimator, detector, single mode, multimode, etc.). The present invention optical receiver may receive any types of optical signals (e.g., light, laser, etc.) of any suitable wavelength or frequency. The receiver may be utilized within any suitable device accommodating optical signals (e.g., optical transceiver, optical communications system or unit, etc.). The receiver and amplifier may accommodate optical signals at any desired data rate (e.g., gigabits, megabits, etc.).

The collimator may be implemented by any quantity of any conventional or other optical device to provide collimated optical signals (e.g., multimode, single mode, etc.). The detector may be implemented by any quantity of any conventional or other detection devices to detect optical signals.

The present invention amplifier may include any quantity of components (e.g., amplification stages, gain elements, filters, limiters, etc.) arranged in any fashion. The limiter may be of any quantity, may be implemented by any conventional or other optical attenuation device (e.g., Variable Optical Attenuator, etc.) and may attenuate the optical signal by any desired amount. The limiter may have a fixed or predetermined attenuation, or the attenuation may be adjustable or dynamic. The narrow band filter may be of any quantity, may be implemented by any conventional or other optical filter and may provide signals within any desired pass band (e.g., optical signals of any desired wavelength or within any desired wavelength range, etc.). The narrow band filter may have a fixed or predetermined pass band, or the pass band may be adjustable or dynamic.

The amplifier may include any quantity of amplification stages arranged in any fashion (e.g., serial, parallel, separated by any quantity of optical devices, etc.). The amplification stages may include any quantity of gain elements, filters or other optical devices arranged in any fashion. The gain elements may be of any quantity, may be implemented by any conventional or other optical amplifier or gain element and may apply any desired gain (e.g., amplification, attenuation, etc.) to provide any desired signals. The gain elements may have a fixed or predetermined gain (or attenuation), or the gain (or attenuation) may be adjustable or dynamic. The gain elements may employ any desired rare earth element (e.g., erbium, etc.) and may be stimulated by any quantity of any desired energy source (e.g., pump or other types of lasers or light sources, etc.) providing any type of energy to any quantity of gain elements at any desired wavelengths or frequencies. Each energy source may provide stimulation energy to any quantity of gain elements. The noise filters may be of any quantity, may be implemented by any conventional or other optical filter (e.g., band pass, high pass, etc.) and may pass or reject any desired band to remove any type of noise (e.g., ASE, etc.) or other extraneous signals from the amplified signals. The noise filters may have a fixed or predetermined configuration for specific extraneous signals (e.g., a fixed or predetermined pass band), or the noise filter may be adjustable or dynamic.

The input and output photodiodes may be implemented by any quantity of any conventional or other optical sensors to measure the strength of optical signals. The amplifier may include any quantity of any type of optical sensors disposed at any locations along or external of the amplifier signal path to measure any characteristics (e.g., signal strength, etc.).

The microcontroller of the present invention amplifier may be implemented by any conventional or other microprocessor, controller or circuitry to perform the functions described herein. Alternatively, any quantity of processors or processing devices or circuitry may be employed within the present invention amplifier, where the processor functions may be distributed in any fashion among any quantity of hardware and/or software modules, processors or other processing devices or circuits. The microcontroller may generate any types of control signals of any format to control any quantity of the amplifier components (e.g., limiter, narrow band filter, gain elements/pump laser, etc.). The microcontroller may control the amplifier components based on any desired information (e.g., optical signal strength, information from the optical receiver or optical transceiver, etc.) and may interface any processing system via any suitable interface (e.g., RS-232, RS-422, etc.) to transfer any desired information (e.g., alarms, temperature, measurements, conditions, etc.). The microcontroller may further be coupled to any sensing or other devices (e.g., sensors, processors, circuitry, etc.) to monitor any desired system conditions (e.g., temperature, power, etc.) and control any suitable devices (e.g., heater/cooling units, power unit, alarms, etc.) in response to those conditions. For example, the microcontroller may indicate an alarm, disable power or control heating/cooling units in response to a temperature condition.

The software for the microcontroller of the present invention amplifier may be implemented in any suitable computer language, and could be developed by one of ordinary skill in the computer and/or programming arts based on the functional description contained herein and the figures illustrated in the drawings. Further, any references herein of software performing various functions generally refer to processors performing those functions under software control. The algorithms described above may be modified in any manner that accomplishes the functions described herein.

The optical signals may be conveyed via any quantity of any suitable carriers (e.g., multimode fiber optics, etc.) of any type, size or shape. The carriers may include any desired characteristics (e.g., numerical aperture, etc.). The carriers may be configured for any desired data rate (e.g., gigabits, megabits, etc.). The connectors may be implemented by any quantity of any conventional or other optical connectors (e.g., SMA, etc.) and may be disposed at any suitable locations within or external of the amplifier or receiver.

The present invention receiver and amplifier are not limited to the applications disclosed herein (e.g., optical communication systems), but may be utilized for any application employing reception and/or amplification (or attenuation) of optical signals.

From the foregoing description, it will be appreciated that the invention makes available a novel multimode fiber optic amplifier and method of amplifying optical signals, wherein a multimode fiber optic amplifier employs dynamic gain adjustment to produce amplified optical signals with reduced noise and at desired levels to prevent optical detector saturation.

Having described preferred embodiments of a new and improved multimode fiber optic amplifier and method of amplifying optical signals, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus to amplify optical signals comprising:
a multimode fiber to receive an input optical signal from an optical signal source and form a signal path through said apparatus;
at least one input signal sensor to measure strength of said input optical signal along said signal path;
a multimode amplification unit subsequent said at least one input signal sensor to receive said input optical signal from said fiber and to amplify and filter said input optical signal, wherein said amplification unit includes a plurality of amplification stages successively coupled to each other, and wherein each stage includes:
a gain element to amplify an optical signal received by that stage; and
a noise filter coupled to said gain element to filter noise from said optical signal amplified by said gain element;
a limiter coupled to said amplification unit to receive and attenuate said amplified optical signal from a final one of said amplification stages to produce an attenuated signal;
a band filter coupled to said limiter to filter said attenuated signal and provide a resulting amplified signal within a desired band;
at least one output signal sensor to measure strength of said resulting amplified signal; and
a microcontroller to collectively control said limiter, said amplification unit and said band filter in accordance with at least said measured signal strengths to control amplification of said input optical signal.

2. The apparatus of claim 1, wherein said gain element includes a doped fiber amplifier.

3. The apparatus of claim 2, wherein said amplification unit further includes:
an energy source to provide energy to stimulate a doped fiber within said doped fiber amplifier in accordance with control signals from said microcontroller to control a gain of said doped fiber amplifier.

4. The apparatus of claim 1, wherein said multimode fiber includes a transverse cross-sectional dimension less than or equal to fifty microns.

5. The apparatus of claim 1 further including:
a multimode collimator coupled to said multimode fiber to serve as said signal source and provide a collimated optical signal to said multimode fiber.

6. The apparatus of claim 1 further including:
an optical detector coupled to said band filter via said multimode fiber to detect said resulting amplified signal, wherein said limiter attenuates said amplified optical signal to a level below a saturation level of said optical detector.

7. The apparatus of claim 1, wherein said band filter is adjustable in accordance with control signals from said microcontroller to pass optical signals within a specified band.

8. The apparatus of claim 1, wherein said apparatus is disposed within an optical communication unit of an optical communication system, and said multimode fiber receives said input optical signal in the form of a transmitted optical signal from another optical communication unit.

* * * * *